United States Patent [19]

Sagishima et al.

[11] 3,994,019
[45] Nov. 23, 1976

[54] VTR SIGNAL DISCRIMINATING APPARATUS IN A TELEVISION RECEIVER

[75] Inventors: Takayuki Sagishima, Suita; Teruo Kitani, Takatsuki; Reiichi Sasaki, Hirakata, all of Japan

[73] Assignee: Matsushita Electric Industrial Co., Ltd., Japan

[22] Filed: Nov. 25, 1974

[21] Appl. No.: 527,149

[30] Foreign Application Priority Data
Nov. 26, 1973 Japan.............................. 48-132372
Nov. 26, 1973 Japan.............................. 48-132376

[52] U.S. Cl..................................... 360/33; 360/37; 360/64; 178/6.6 HS; 179/100.11
[51] Int. Cl.² ........................................ G11B 27/36
[58] Field of Search .................. 360/37, 38, 64, 33; 178/6.6 P, 6.6 HS; 179/100.11

[56] References Cited
UNITED STATES PATENTS 3,384,708  5/1968  Stosberg ........................ 178/6.6 HS
3,829,612  8/1974  Beyers ................................. 360/33

Primary Examiner—Bernard Konick
Assistant Examiner—Alan Faber
Attorney, Agent, or Firm—Wenderoth, Lind & Ponack

[57] ABSTRACT

A VTR signal discriminating apparatus for a television receiver generates discriminating signals when the receiver having this apparatus is receiving signals e.g. from a home use video tape recorder (VTR). This apparatus detects video head switching noises mixed in signals from the VTR having two video heads which are alternately switched every field of the signals by counting the number of apparent sync signals received within a given period of time. Thus, video signals originating from a broadcast station are distinguished from video signals originating from the VTR and the invention output denotes the presence of the appropriate signal. A television receiver can be modified in response to the invention output to accommodate the characteristics of the particular video signal received.

5 Claims, 33 Drawing Figures

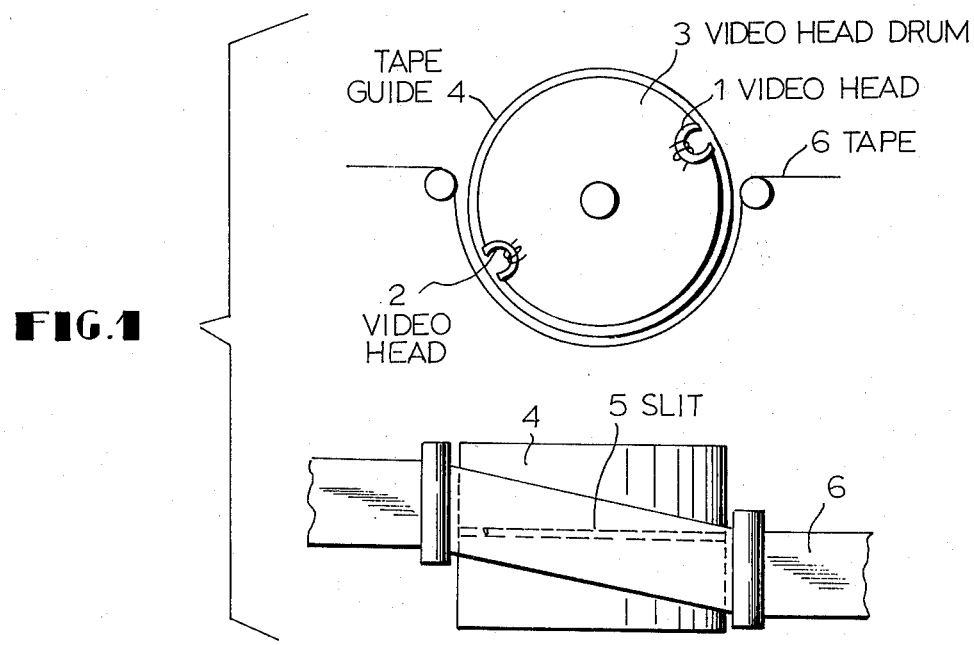
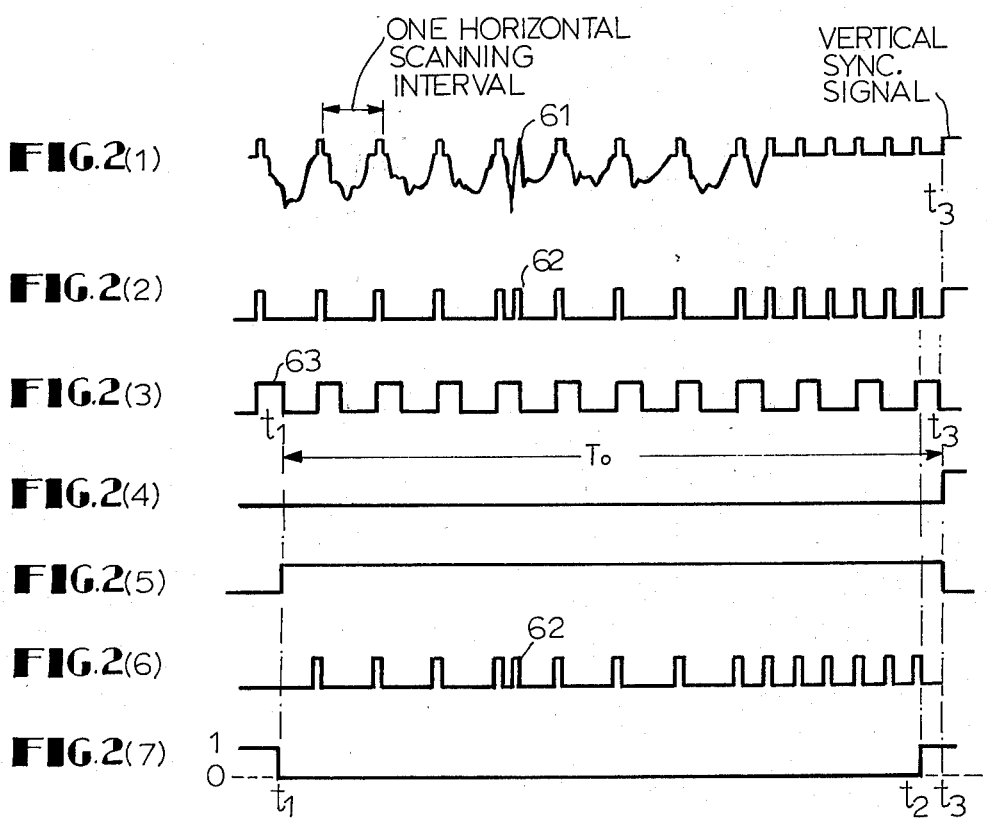

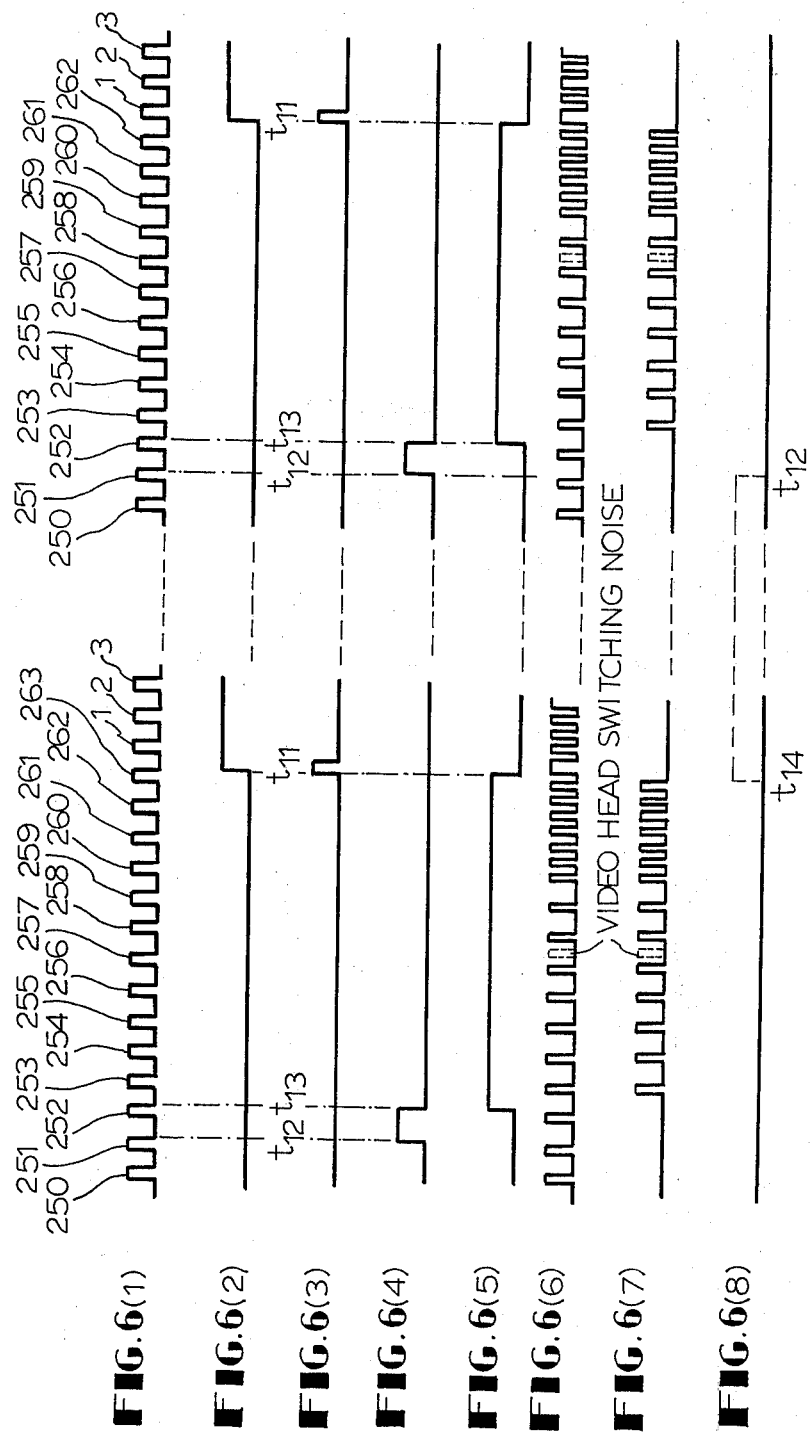

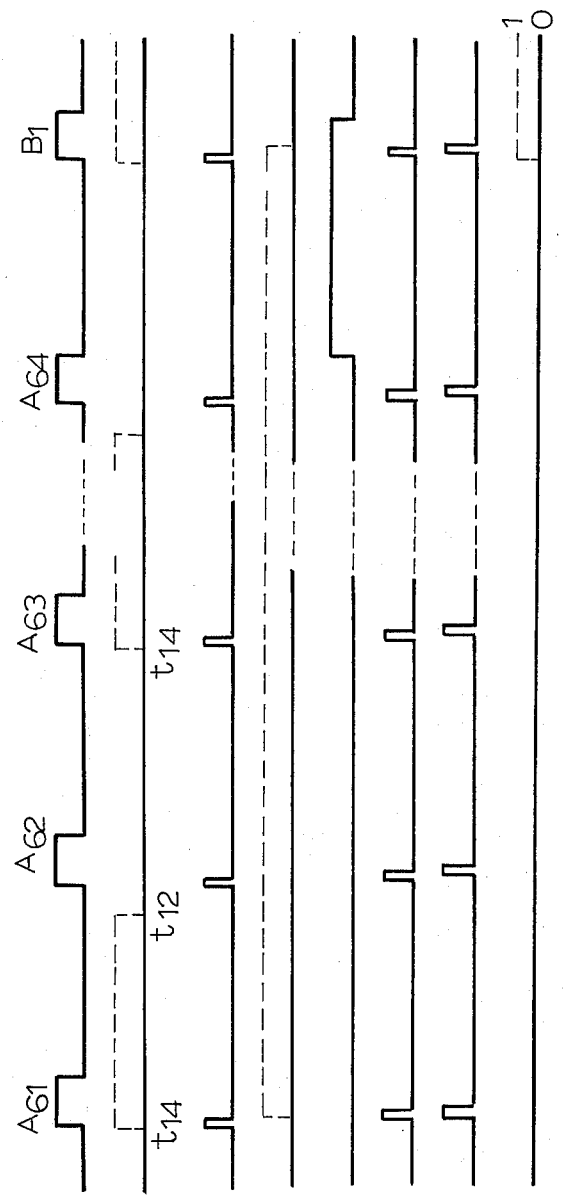

VTR SIGNAL DISCRIMINATING APPARATUS IN A TELEVISION RECEIVER

FIELD OF THIS INVENTION

This invention relates to a VTR (video tape recorder) signal discriminating apparatus for a television receiver. This apparatus generates discriminating signals when a television receiver having this apparatus is receiving signals e.g. from a home use VTR.

DESCRIPTION OF THE PRIOR ART

Signals e.g. from a home use VTR are not completely the same as the normal signals from general broadcasting stations, especially with respect to jitters of synchronous signals and video bandwidth. When signals from the home use VTR are received by a general television receiver which has a suitable characteristic for receiving signals from the general broadcasting stations, it is often desirable to change the receiving characteristics of the receiver to be fit for receiving the signals from the home use VTR. At present, there is no apparatus for automatically discriminating, in a television receiver, whether signals received by the television receiver are from a home use VTR or a general broadcasting station. So when the receiving characteristic of the television receiver is required to be changed to be suitable to receive signals from a home use VTR, viewers must change the receiver manually.

SUMMARY OF THE INVENTION

It is an object of this invention to provide a VTR signal discriminating apparatus that automatically discriminates among received signals and generates a discriminating signal indicating receipt of VTR signals when a television receiver having this apparatus is receiving signals e.g. from a home use VTR, which signal can be used, for example, for automatically switching the television receiver to change the receiving characteristics.

To achieve this object, a VTR signal discriminating apparatus in a television receiver according to this invention comprises: a head switching position detector having an input terminal for horizontal sync signals from a horizontal oscillator and another input terminal for vertical sync signal for detecting the specific interval in each vertical scanning interval during which video heads of a VTR may be switched when the television receiver is receiving signals from the VTR; a gate having an input terminal for sync signals from a sync separator and coupled to the head switching position detector for passing sync signals from the sync separator during the above mentioned specific interval; a pulse noise detector coupled to the gate for detecting video head switching noises mixed in the sync signals from the sync separator; a memory coupled to the pulse noise detector for memorizing information as to whether the pulse noise detector has detected the video head switching noises or not between memory refresh signals; and a memory refresh signal generator for generating the memory refresh signals and supplying them to the memory.

BRIEF DESCRIPTION OF THE DRAWINGS

These and other objects and features of this invention will be apparent from the following description taken together with the accompanying drawings in which:

FIG. 1 is a schematic view showing the mechanical arrangement of a rotary video and tape in a home use VTR;

FIG. 2(1) is a graph showing one example of reproduced video signals;

FIG. 2(2) is a graph showing sync signals from a sync separator in a television receiver when the receiver is receiving signals from the home use VTR;

FIG. 2(3) is a graph showing horizontal sync signals from a horizontal oscillator;

FIG. 2(4) is a graph showing a vertical sync signal;

FIG. 2(5) is a graph showing a gate pulse of a gate pulse generator in the block diagram of FIG. 3;

FIG. 2(6) is a graph showing output signals of a gate in the block diagram of FIG. 3;

FIG. 2(7) is a graph showing output signals of a decoder in the block diagram of FIG. 3;

FIG. 4(2) is a graph showing output signals of the decoder in the block diagram of FIG. 3;

FIG. 4(3) is a graph showing output signals of a vertical sync pulse counter in the block diagram of FIG. 3;

FIG. 4(4) is a graph showing an output pulse series $P_A, P_B, \ldots$ of a memory control pulse generator in the block diagram of FIG. 3;

FIG. 4(5) is a graph showing output signals of a temporary memory in the block diagram of FIG. 3;

FIG. 4(6) is a graph showing an output pulse series $P_A', P_B', \ldots$ of the memory control pulse generator;

FIG. 4(7) is a graph showing output signals at an output terminal of a discriminating signal memory in the block diagram of FIG. 3;

FIG. 6(1) to FIG. 6(8) are graphs showing signals of practical circuits in the schematic diagram of FIGS. 5; and FIG. 7(1) to FIG. 7(8) are graphs showing signals of the circuits in the schematic diagram of FIG. 5 during several vertical scanning intervals.

DESCRIPTION OF PREFERRED EMBODIMENTS

Figure 3:
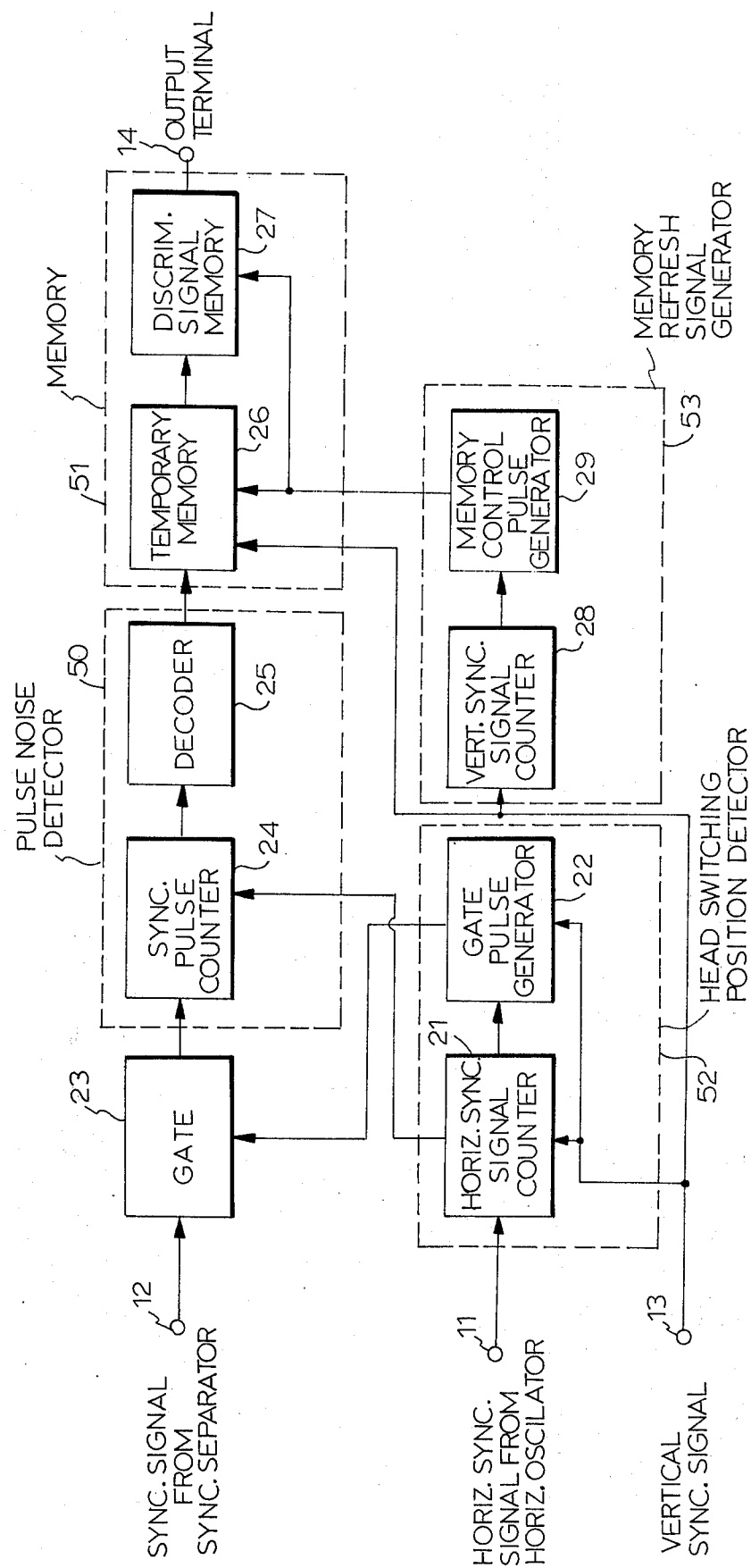
FIG. 3 is a block diagram of one embodiment of a VTR signal discriminating apparatus for a television receiver in accordance with this invention.

At present, a video tape recoder (hereinafter referred to as VTR) for home use generally has two video heads. This invention relates to the discrimination of signals from this type of VTR. An example of the mechanical structure of the rotary video head arrangement of this type of VTR together with a tape is as shown in FIG. 1. It is necessary to rotate the video heads for accelerating tape speed relative to the heads. Two video heads 1 and 2 are placed on the periphery of a video head drum 3 at the ends of a diameter as shown in FIG. 1. A cylindrical tape guide 4 has a slightly larger inner diameter than that of the video head drum 3 and has a slit 5 therein. The video head drum 3 is horizontally inserted in the tape guide 4 and is placed so that the heads 1 and 2 move horizontally along the slit 5 when the video head drum 3 rotates. The video head drum 3 rotates at such a speed that the time required for one full rotation is equal to two times one television vertical scanning interval, that is, the video head drum 3 rotates at the rate of about 30 rotations per second. A tape 6 is guided around on a half of the cylindrical tape guide 4, like a letter $\Omega$, and is run obliquely to the slit 5 in a direction opposite to that of the rotation of the video head drum 3. During a half rotation of the video head drum 3, each video head records video signals for one field on one oblique track of the tape 6. The two video heads alternately record the video signals on the tape at the rate of one oblique track for one field. When reproducing, signals from two heads which trace along the video recording track on the tape are alternately switched field by field, and continuous reproduced video signals are obtained. The position for this video switching is usually adjusted so as to be between the first and tenth horizontal line before the leading edge of the vertical sync signals (pulses) in order not to deteriorate the quality of the picture and not to exert bad influence upon the vertical sync signals. So when reproducing, head switching noises are generated at the specific positions and they are mixed into the reproduced video signals. This invention provides a VTR signal discriminating apparatus for a television receiver for discriminating signals from the VTR as described above from the signals from general broadcasting stations, by using the above feature of the signals from the home use VTR.

In FIG. 2(1), there is shown an example of reproduced video signals from the home use VTR as described above. The head switching noise 61 is mixed with the reproduced video signals within the bounds of 5±5 horizontal scanning intervals (H) before the leading edge of the vertical sync signals. When a television receiver receives signals from the home use VTR such that the video signals are as indicated in FIG. 2(1), a pulse noise 62 is mixed with the sync signals from a sync separator in the television receiver, as shown in FIG. 2(2). On the other hand, this type of pulse noise is not mixed with horizontal sync signals from a horizontal oscillator having an automatic frequency control (AFC) function in the television receiver, as shown in FIG. 2(3). When a television receiver is receiving signals from a home use VTR, the number of the sync pulse signals from the sync separator in the television receiver, as shown in FIG. 2(2), is greater in every field than the case when the television receiver is receiving signals from general broadcasting stations. Therefore, it is possible to discriminate the signals from the VTR from the signals from general broadcasting stations by counting the sync pulse signals from the sync separator, as shown in FIG. 2(2), in every field. That counting is not necessarily carried out during the full vertical scanning interval on every field. This is because, as mentioned above, the position for the video head switching is usually adjusted so as to be between the first and the tenth horizontal lines before the leading edge of the sync signals. That the counting is carried out in every field only during a specific time interval the video head switching noise will be mixed therein, has the advantage that pulse noises other than those in the specific time interval are not counted. That specific interval is decided by the fact that the position for the video head switching is usually adjusted so as to be between the first and the tenth horizontal lines before the leading edge of the sync signals, and is stably provided by counting the horizontal sync signals without the video head switching noise from a horizontal oscillator, as shown in FIG. 2(3). Turning now to FIG. 3, there is shown a block diagram of an embodiment of the VTR signal discriminating apparatus. A head switching position detector 52 detects the specific time interval by counting horizontal sync signals without the video head switching noises, from a horizontal oscillator. A pulse noise detector 50 counts the sync signals from the sync separator during said specific time interval in every field and detects whether the video head switching noise has been present or not during said specific time interval in every field. A horizontal sync signal counter 21 starts counting at time $t_3$, the leading edge of vertical sync signals, as shown in FIG. 2(4), and counts the horizontal sync signals from the horizontal oscillator fed from input terminal 11, as shown in FIG. 2(3), and detects the specific horizontal sync pulse 63, as shown in FIG. 2(3), the trailing edge of which is at time $t_1$ at the start of a specific time interval $T_o$ before the time $t_3$, the leading edge of the vertical sync signals as shown in FIG. 2(4). The time interval $T_o=(t_1-t_3)$ is so determined that during the time interval $T_o$, the video head switching noise will be mixed therein. In the example as shown in FIG. 2(3), the specific pulse 63 is the 12th pulse before the leading edge of the vertical sync signals as shown in FIG. 2(4). A gate pulse generator 22 connected to the horizontal sync signal counter 21 as shown in FIG. 3 generates gate pulses having pulse width T every vertical scanning interval, as shown in FIG. 2(5). A head switching position detector 52 is constituted by the sync signal counter 21 and the pulse generator 22, as shown by the dotted lines in FIG. 3, and detects the specific interval $T_o$ during which the video heads of a VTR are switched when the television receiver is receiving signals from the VTR.

A gate 23 is connected to the gate pulse generator 22, as shown in FIG. 3, passes the sync signals from the sync separator in the television receiver, as shown in FIG. 2(2), fed from input terminal 12 during the time interval $T_o$ by using the gate pulses from the gate pulse generator 22 as shown in FIG. 2(5). In FIG. 2(6), there are shown output signals from the gate 23. A sync pulse counter 24, as shown in FIG. 3, connected to gate 23 to receive the output therefrom and to horizontal sync signal counter 21 and is reset at the time $t_1$ by utilizing the output signals of the horizontal sync signal counter 21 and counts the output pulse signals of the gate 23, as shown in FIG. 2(6).

At time $t_2$, the trailing edge of the sync signal pulse just before the time $t_3$, the content of the sync pulse counter 24 is greater by one when the video head switching noise 62 is mixed in the sync signal, as shown in FIG. 2(6), than when the noise 62 is not mixed therein. In the case of the example as indicated in FIG. 2(6), the content of the sync pulse counter 24 is 14 at the time $t_2$ when the video head switching noise 62 is not mixed in the sync signal, and it is 15 when the noise is mixed therein. The content of the sync pulse counter 24 is held until the time $t_1$ on the next vertical scanning interval. A decoder 25, is connected to the sync pulse counter 24, as shown in FIG. 3, and generates logical 1 output or logical 0 output according to the content of the sync pulse counter 24. In FIG. 2(7), there is shown in a solid line the output signal of the decoder 25 when the video head switching noise is mixed in the sync signal and in a dotted line the output when the noise is not mixed therein. A pulse noise detector 50 constituted by the sync pulse counter 24 and the decoder 25, as shown by dotted line in FIG. 3, generates the logical 1 output when the video head switching noise is mixed in the sync signal, and it generates the logical 0 output when the noise is not mixed therein.

However, the video head switching noise in the sync signal from the sync separator often lies on the sync pulses, and it is often impossible for the sync pulse counter 24 to separate the video head switching noise from the sync signal and to count the noise separately. Therefore, in this invention, in order to get static discriminating signals which indicate that the television receiver having the apparatus of this invention is receiving the signals from the VTR, a memory 51 and a memory refresh signal generator 53, as shown by dotted lines in FIG. 3, are added. Briefly, the memory refresh signal generator 53 generates memory refresh signals once during a specified time interval $T_1$ of several N vertical scanning intervals and memory 51 is made logical 1 when the pulse noise detector 50 has generated logical 1 signal at least one time during the specified time interval $T_1$, and the memory 51 is made logical 0 when the pulse noise detector 50 has not generated a logical 1 signal during the specified time interval $T_1$. The specified time interval $T_1$ is so determined that there is a probability that the pulse noise detector 50 has generated a logical 1 output during the time interval $T_1$ at least one time when the receiver receives the signals from VTR.

Figure 4:
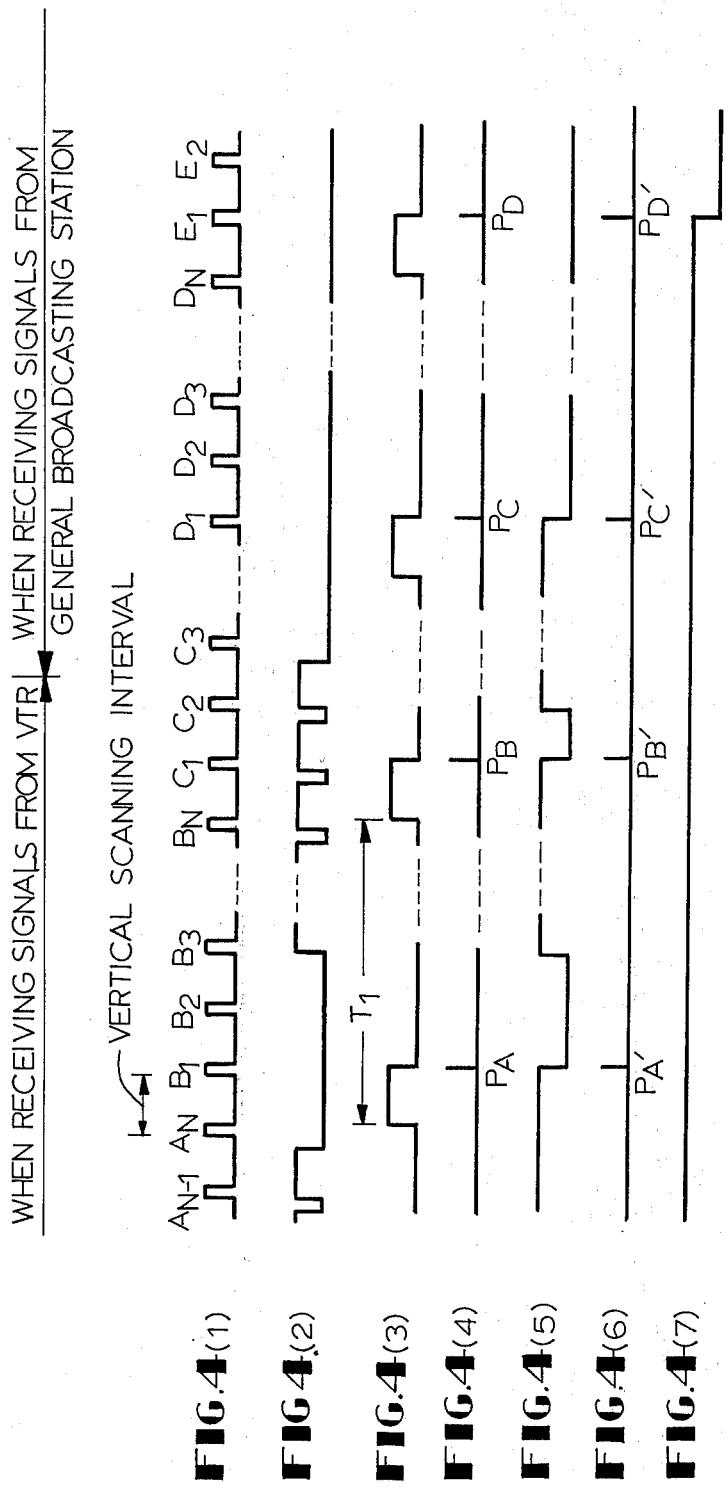
FIG. 4(1) is a graph showing vertical sync signals.

In FIG. 4(1), there are shown the vertical sync signals, and there are shown in FIG. 4(2) the output signals of the decoder 25, as also shown in FIG. 2(7), during several vertical scanning intervals. Even if the television receiver is receiving the signals from the home use VTR, when the video head switching noises lie on the sync signal pulses, the output of the decoder 25 is not logical 1 just before the vertical sync signals. A vertical sync pulse counter 28 forming part of the memory refresh signal generator 53 and connected to receive the vertical sync signal from terminal 13, as shown in FIG. 3, counts N vertical sync signals, as shown in FIG. 4(1), and generates pulses the leading edges of which are coincident with the trailing edges of the vertical sync signals and the trailing edges of which are coincident with the leading edge of the next vertical sync signal every N vertical sync signals, as shown in FIG. 4(3). A memory control pulse generator 29 connected to the vertical sync signal counter 28 to receive the output therefrom and constituting the rest of the memory refresh signal generator 53, as shown in FIG. 3, generates pulse series $P_A$, $P_B$, ... as shown in FIG. 4(4) and $P_A'$, $P_B'$, ... as shown in FIG. 4(6), and feeds them to a temporary memory 26 and discriminating signal memory 27, respectively, and which together constitute the memory 51. The pulse series $P_A'$, $P_B'$ ..., as shown in FIG. 4(6), are generated at the trailing edges of the output signals of the vertical sync pulse counter 28, as shown in FIG. 4(3). The pulse series $P_A$, $P_B$, ... as shown in FIG. 4(4) are generated at a slightly delayed time from the pulse series $P_A'$, $P_B'$, .... The content of the temporary memory 26, as shown in FIG. 3, becomes logical 1 when the output of the decoder 25 is logical 1 at the trailing edge of the vertical sync pulses and holds that condition until reset pulses, the pulse series $P_A$, $P_B$, ..., are fed thereto. The temporary memory 26 is reset to logical 0 by the pulse series $P_A$, $P_B$, ..., as shown in FIG. 4(4). So, if the output signals of the decoder 25 are as shown in FIG. 4(2), for example, the content of the temporary memory 26 is as shown in FIG. 4(5). The discriminating signal memory 27 as shown in FIG. 3 reads the content of the temporary memory 26 just before the temporary memory 26 is reset by using the pulses $P_A'$, $P_B'$ ... as shown in FIG. 4(6). Accordingly, when the output signals of the decoder 25 are as indicated in FIG. 4(2), for example, output signals at the output terminal 14 of memory 51 are as indicated in FIG. 4(7). Logical 1 output corresponds to the case that the television receiver is receiving the signals from the home use VTR and logical 0 ouput corresponds to the case that the receiver is receiving the signals from the general broadcasting stations.

Figure 5:
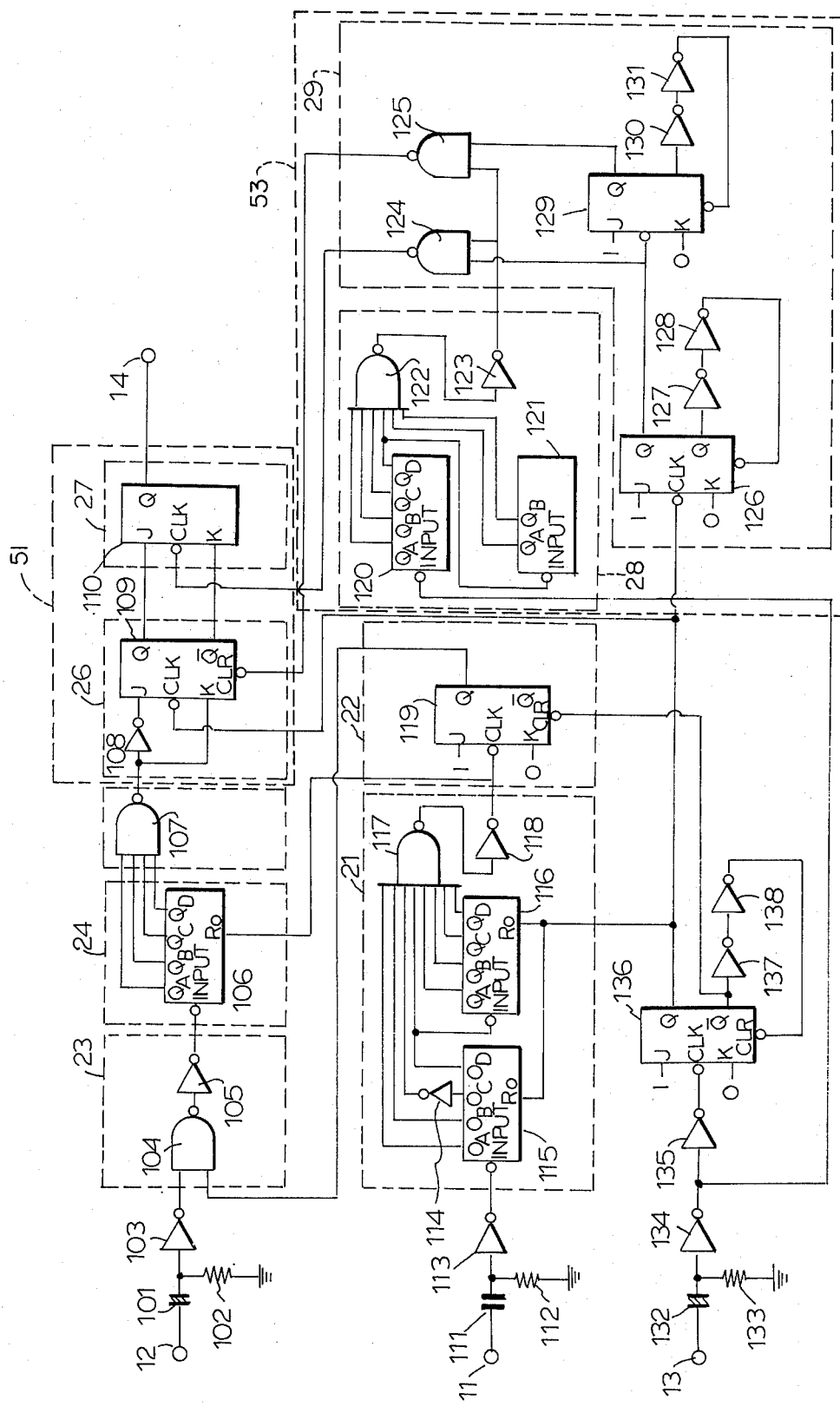
FIG. 5 is a schematic diagram of a practical embodiment of the VTR signal discriminating apparatus in FIGS. 3.

Referring to FIG. 5, there is shown a schematic diagram of a practical embodiment of the VTR signal discriminating apparatus the FIG. 3. In FIG. 5, the blocks identical to those of FIG. 3 are indicated by the same reference numerals.

Vertical sync signals reshaped in Schmitt trigger inverter 134, as shown in FIG. 6(2), are passed through an inverter 135 and are fed to a clock input of a J-K flip flop 136 which has a mono-multivibrator function. The signals at the Q output terminal of the flip flop 136 are pulses the leading edges of which coincide with the leading edge of the vertical sync signals at $t_{11}$, and have a pulse width which is determined by the delay time of inverters 137 and 138, as shown in FIG. 6(3). These pulse signals reset two 4-bit binary counters 115 and 116. Horizontal sync signals reshaped by a Schmitt trigger inverter 113, as shown in FIG. 6(1), are fed to an input terminal of the 4-bit binary counter 115. These two 4-bit binary counters 115 and 116 count their input pulses at the trailing edges thereof. A $Q_C$ output signal of the 4-bit binary counter 115 supplied through an inverter 114, $Q_A$, $Q_B$, and $Q_D$ outputs of the 4-bit binary counter 115, and all 4 outputs of the 4-bit binary counter 116 are connected directly to a NAND gate 117. Output signals of the NAND gate 117 are fed to an inverter 118. Output signals of the inverter 118 are pulses which rise at an instant when the $Q_A$, $Q_B$, $Q_C$ and $Q_D$ output signals of the 4-bit binary counter 115, and $Q_A$, $Q_B$, $Q_C$ and $Q_D$ output signals binary counter 116 become logical 1, 1, 0, 1 and 1, 1, 1, 1 output, respectively, that is at time $t_{12}$ when the 251st horizontal sync signal from the time $t_{11}$ falls, and which fall at an instant when 252nd horizontal sync signal falls (at time $t_{13}$) as shown in FIG. 6(4). The inverter 118 feeds its output signals to a clock input of a J-K flip flop 119. The J-K flip flop 119 generates pulses which rise at time $t_{13}$ and fall at time $t_{11}$, as shown in FIG. 6(5), and the pulses are fed to one of two input terminals of a NAND gate 104.

Sync signals from a sync separator in a television receiver which are reshaped in a Schmitt trigger inverter 103, as shown in FIG. 6(6), are fed to the other input terminal of the NAND gate 104. Output signals of the NAND gate 104 fed through an inverter 105 are pulses which are extracted from the output signals of the Schmitt trigger inverter 103, as shown in FIG. 6(6), during the time interval $t_{13}-t_{11}$, as shown in FIG. 6(7). The pulses are fed to an input terminal of a 4-bit binary counter 106. The 4-bit binary counter 106 is reset by the output signals of the inverter 118, as shown in FIG. 6(4). $Q_A$, $Q_B$, $Q_C$ and $Q_D$ output signals of the 4-bit binary counter 106 are fed to input terminals of a NAND gate 107. Output signals of the NAND gate 107 are fed directly to a K input terminal of a J—K flip flop 109, and they are fed to a J input terminal through an inverter 108. Output signals of the inverter 108 are logical 1, only when $Q_A$, $Q_B$, $Q_C$ and $Q_D$ output signals of the 4-bit binary counter 106 are all logical 1, that is only when the 4-bit binary counter 106 has counted 15 pulses.

The output signal of the inverter 108 is logical 1, as shown by dotted lines in FIG. 6(8), or in FIG. 7(2), from time $t_{14}$ in odd fields until time $t_{12}$ in the next even field. The time $t_{14}$ is the time when the video head switching noise is mixed in the output signals of the inverter 105 and the 4-bit counter 106 has counted out 15 pulses. But the output signals of the inverter 108 are always logical 0, as shown by solid lines in FIG. 6(8) or in FIG. 7(2), when the video head switching noises are not mixed in. When Q output signals of the flip flop 136, as shown in FIG. 6(3), are fed to a clock input of the flip flop 109, the J and K input signals of the J–K flip flop 109 are logical 1 and logical 0 only when the video head switching noises are mixed in the sync signals in the odd field. Therefore, the J–K flip flop 109 is to logical 1 only in the case as mentioned above, as shown by dotted lines in FIG. 7(4). The vertical sync signals of the Schmitt trigger inverter 134, as shown in FIG. 6(2) or in FIG. 7(1), are also applied to a 4-bit binary counter 120, and $Q_D$ output signal of the 4-bit binary counter 120 is fed to an input terminal of a 4-bit binary counter 121. $Q_A$, $Q_B$, $Q_C$ and $Q_D$ output signals of the 4-bit binary counter 120, and $Q_A$ and $Q_B$ output signals of the 4-bit binary counter 121 are fed to a decoder circuit consisting of NAND gates 122 and an inverter 123. The inverter 123 generates pulse signals every 64 vertical sync pulses which rise at the trailing edge of the 64th vertical sync pulse and fall at the trailing edge of the next vertical sync pulse, as shown in FIG. 7(5). Meanwhile, a J–K flip flop 126 generates pulse signals, as shown in FIG. 7(6), which rise at the trailing edges of the Q output signals of the flip flop 136, as shown in FIG. 7(3), and which have a pulse width determined by the delay time of an inverter 127 and an inverter 128. The output signals of the inverter 123, as shown in FIG. 7(5), and the Q output signals of the flip flop 126, as shown in FIG. 7(6), are fed to a NAND gate 124, and output signals of the NAND gate 124 are fed to a clock input of a J–K flip flop 110. So the flip flop 110 reads the content of the flip flop 109 every 64 vertical scanning intervals. Therefore, the J–K flip flop 110 generates static logical 1 output signals at its Q output terminal, as shown by dotted lines in FIG. 7(8), when the video head switching noises have been mixed in during 64 vertical scanning intervals and the J–K flip flop 109 has logical 1 output signals at its Q output, as shown by dotted lines in FIG. 7(4).

On the other hand, the J–K flip flop 110 generates static logical 0 output signals at its Q output, as shown by solid lines in FIG. 7(8), when the video head switching noises have not been mixed in during 64 vertical scanning intervals and the J–K flip flop 109 has logical 0 output signals at its Q output, as shown by solid lines in FIG. 7(4). A J–K flip flop 129 generates pulse signals, as shown in FIG. 7(7), which rise at the trailing edge of the Q output signals of the J–K flip flop 126, as shown in FIG. 7(6), and have a pulse width determined by the delay time of inverters 130 and 131. This pulse and the output signals of the inverter 123 are fed to a NAND gate 125. Output signals of the NAND gate 125 are fed to the clear input of the J–K flip flop 109. Therefore, the flip flop 109 is reset after its contents have been transferred to the J–K flip flop 110.

In the specific embodiment of FIG. 5 satisfactory results are obtained by employing the following specified components.

| Component | Reference numeral | Value or type |
|---|---|---|
| Capacitor | 101 | 22μF |
| Resistor | 102 | 10KΩ |
| Schmitt-trigger inverter IC | 103 | SN7414N |
| NAND gate IC | 104 | SN7400N |
| Inverter IC | 105 | SN7404N |
| Binary counter IC | 106 | SN7493A |
| NAND gate IC | 107 | SN7420N |
| Inverter IC | 108 | SN7404N |
| J-K Flip flop IC | 109 | SN7473N |
| J-K Flip flop | 110 | SN7473N |
| Capacitor | 111 | 0.01μF |
| Resistor | 112 | 10KΩ |
| Schmitt-trigger inverter IC | 113 | SN7414N |
| Inverter IC | 114 | SN7404N |
| Binary counter IC | 115 | SN7493A |
| Binary counter | 116 | SN7493A |
| NAND gate IC | 117 | SN7430N |
| Inverter IC | 118 | SN7404N |
| J-K Flip flop IC | 119 | SN7473N |
| Binary counter IC | 120 | SN7493A |
| Binary counter IC | 121 | SN7493A |
| NAND gate IC | 122 | SN7430N |
| Inverter IC | 123 | SN7404N |
| NAND gate IC | 124 | SN7400N |
| NAND gate IC | 125 | SN7400N |
| J-K Flip flop IC | 126 | SN7473N |
| Inverter IC | 127 | SN7404N |
| Inverter IC | 128 | SN7404N |
| J-K flip flop IC | 129 | SN7473N |
| Inverter IC | 130 | SN7404N |
| Inverter IC | 131 | SN7404N |
| Capacitor | 132 | 22μF |
| Resistor | 133 | 10KΩ |
| Schmitt trigger inverter IC | 134 | SN7414N |
| Inverter IC | 135 | SN7404N |
| J-K Flip flop IC | 136 | SN7473N |
| Inverter IC | 137 | SN7404N |
| Inverter IC | 138 | SN7404N |

Thus, this invention provides a new and improved VTR signal discriminating apparatus in for a television receiver for automatically discriminating signals from a VTR. It may be needless to say that it is clear that the technical concept of this invention can be employed not only for a television receiver in which the vertical scanning frequency is 60 Hz and the number of horizontal scanning lines is 525, but also for a television receiver in which the scanning frequency and the horizontal scanning lines are different from those described above.

While one embodiment of this invention has been illustrated and described in detail hereinbefore, it should be understood that this invention is not limited to this embodiment, and that minor modifications of the embodiment are included in the scope of this invention.

What is claimed is:
1. A VTR signal discriminating apparatus for a television receiver having a horizontal sync separator and a horizontal oscillator, said apparatus comprising:
head switching position detecting means having an input terminal for horizontal sync signals from said horizontal oscillator and another input terminal for vertical sync signal for detecting a specific interval in each vertical scanning interval during which video heads of a VTR may be switched when said television receiver is receiving signals from said VTR;
gate means having an imput terminal for sync signals from said sync separator and coupled to said head switching position detecting means for passing said sync signals from said sync separator during said specific interval in which said video heads of said VTR may be switched; pulse noise detecting means coupled to said gate means for detecting video head switching noises mixed in said sync signals from said sync separator;

memory means coupled to said pulse noise detecting means for memorizing information as to whether said pulse noise detector has detected said video head switching noises or not between memory refresh signals; and memory refresh signal generating means for generating said memory refresh signals and for supplying the same to said memory means.

2. A VTR signal discriminating apparatus as claimed in claim 1, wherein said head switching position detecting means comprises: a horizontal sync signal counter having two input terminals, one for said horizontal sync signals from said horizontal oscillator and the other for said vertical sync signals, for counting said horizontal sync signals and for detecting a specific horizontal sync signal pulse in one vertical scanning interval; and a gate pulse generator coupled to said horizontal sync signal counter for generating gate pulses having a pulse width between said specific horizontal sync signal pulse and said vertical sync signals.

3. A VTR signal discriminating apparatus as claimed in claim 1, wherein said pulse noise detecting means comprises: a sync pulse counter coupled to said gate means for counting output signals of said gate means; and a decoder coupled to said sync pulse counter for decoding output signals of said sync pulse counter and for generating logical 1 output only when said sync pulse counter has counted output signals of said gate means having said video head switching noise therein.

4. A VTR signal discriminating apparatus as claimed in claim 1, wherein said memory means comprises: a temporary memory coupled to said decoder for memorizing logical 1 at an instant when said decoder generates logical 1 output and for holding the same until receipt of said memory refresh signals; and a discriminating signal memory coupled to said temporary memory for reading the content of said temporary memory just before said temporary memory is reset.

5. A VTR signal discriminating apparatus as claimed in claim 1, wherein said memory refresh signal generating means comprises: a vertical sync signal counter having said input terminal of vertical sync signals connected thereto for counting said vertical sync signals and for detecting a specific vertical sync signal pulse; and a memory control pulse generator coupled to said vertical sync signal counter for generating control pulses for said memory means by means of said specific vertical sync signal pulse.

* * * * *